United States Patent
Printz et al.

(10) Patent No.: US 8,793,127 B2
(45) Date of Patent: Jul. 29, 2014

(54) METHOD AND APPARATUS FOR AUTOMATICALLY DETERMINING SPEAKER CHARACTERISTICS FOR SPEECH-DIRECTED ADVERTISING OR OTHER ENHANCEMENT OF SPEECH-CONTROLLED DEVICES OR SERVICES

(75) Inventors: Harry Printz, San Francisco, CA (US); Vikas Gulati, Mountain View, CA (US)

(73) Assignee: Promptu Systems Corporation, Menlo Park, CA (US)

( * ) Notice: Subject to any disclaimer, the term of this patent is extended or adjusted under 35 U.S.C. 154(b) by 0 days.

(21) Appl. No.: 11/930,993

(22) Filed: Oct. 31, 2007

(65) Prior Publication Data
US 2008/0103761 A1    May 1, 2008

Related U.S. Application Data

(63) Continuation-in-part of application No. 10/699,543, filed on Oct. 30, 2003, now Pat. No. 7,519,534.

(60) Provisional application No. 60/422,561, filed on Oct. 31, 2002.

(51) Int. Cl.
*G10L 17/00* (2013.01)
*G10L 15/16* (2006.01)
*G10L 15/18* (2013.01)

(52) U.S. Cl.
USPC .......... 704/232; 704/250; 704/257; 704/275; 705/14.66

(58) Field of Classification Search
CPC ......... G10L 15/16; G10L 15/18; G10L 17/18; G10L 17/22; G06Q 30/0269
USPC ......... 704/231, 243, 246, 250, 270, 275, 232, 704/257; 379/88.01, 88.04, 88.18; 705/14, 705/14.66
See application file for complete search history.

(56) References Cited

U.S. PATENT DOCUMENTS 5,553,119 A * 9/1996 McAllister et al. ........ 379/88.01
5,581,655 A 12/1996 Cohen et al.
(Continued)

FOREIGN PATENT DOCUMENTS

EP    1341363    9/2003
EP    1003018    5/2005
(Continued)

OTHER PUBLICATIONS

Belzer, et al.; *Symmetric Trellis-Coded Vector Quantizaton*; Nov. 1997; IEEE Transactions on Communications, IEEE Servic eCenter, Piscataway NJ, vol. 45, No. 11, pp. 1354-1357; par II figure 2.
(Continued)

*Primary Examiner* — Martin Lerner
(74) *Attorney, Agent, or Firm* — Michael A. Glenn; Perkins Coie LLP

(57) ABSTRACT

In addition to conveying primary information, human speech also conveys information concerning the speaker's gender, age, socioeconomic status, accent, language spoken, emotional state, or other personal characteristics, which is referred to as secondary information. Disclosed herein are both the means of automatic discovery and use of such secondary information to direct other aspects of the behavior of a controlled system. One embodiment of the invention comprises an improved method to determine, with high reliability, the gender of an adult speaker. A further embodiment of the invention comprises the use of this information to display a gender-appropriate advertisement to the user of an information retrieval system that uses a cell phone as the input and output device. The invention is not limited to gender and such secondary information can include, for example, any of information concerning the speaker's age, socioeconomic status, accent, language spoken, emotional state, or other personal characteristics.

4 Claims, 3 Drawing Sheets

(56) References Cited

U.S. PATENT DOCUMENTS

| | | | |
|---|---|---|---|
| 5,611,019 A | 3/1997 | Nakatoh et al. | |
| 5,698,834 A | 12/1997 | Worthington et al. | |
| 5,737,723 A | 4/1998 | Riley et al. | |
| 5,752,232 A | 5/1998 | Basore et al. | |
| 5,774,859 A | 6/1998 | Houser et al. | |
| 5,963,903 A | 10/1999 | Hon et al. | |
| 6,009,387 A | 12/1999 | Ramaswamy et al. | |
| 6,012,058 A | 1/2000 | Fayyad et al. | |
| 6,021,387 A | 2/2000 | Mozer et al. | |
| 6,130,726 A | 10/2000 | Darbee et al. | |
| 6,141,640 A | 10/2000 | Moo | |
| 6,182,039 B1 | 1/2001 | Rigazio et al. | |
| 6,260,013 B1 | 7/2001 | Sejnoha | |
| 6,263,308 B1 | 7/2001 | Heckerman et al. | |
| 6,298,324 B1 | 10/2001 | Zuberec et al. | |
| 6,301,560 B1 | 10/2001 | Masters | |
| 6,320,947 B1 | 11/2001 | Joyce | |
| 6,336,091 B1 | 1/2002 | Polikaitis et al. | |
| 6,374,177 B1 | 4/2002 | Lee | |
| 6,374,226 B1 | 4/2002 | Hunt et al. | |
| 6,381,316 B2 | 4/2002 | Joyce | |
| 6,408,272 B1 | 6/2002 | White et al. | |
| 6,415,257 B1 | 7/2002 | Junqua et al. | |
| 6,424,935 B1* | 7/2002 | Taylor | 704/10 |
| 6,446,035 B1* | 9/2002 | Grefenstette et al. | 704/9 |
| 6,658,414 B2 | 12/2003 | Bryan | |
| 6,665,644 B1* | 12/2003 | Kanevsky et al. | 704/275 |
| 6,711,541 B1 | 3/2004 | Kuhn et al. | |
| 6,711,543 B2 | 3/2004 | Cameron | |
| 6,714,632 B2 | 3/2004 | Joyce et al. | |
| 6,721,633 B2 | 4/2004 | Funk | |
| 6,725,022 B1 | 4/2004 | Clayton | |
| 6,728,531 B1 | 4/2004 | Lee | |
| 6,799,201 B1 | 9/2004 | Lee | |
| 6,804,653 B2 | 10/2004 | Gabel | |
| 6,892,083 B2 | 5/2005 | Shostak | |
| 6,901,366 B1 | 5/2005 | Kuhn et al. | |
| 6,975,993 B1 | 12/2005 | Keiller | |
| 6,985,865 B1 | 1/2006 | Packingham et al. | |
| 7,020,609 B2 | 3/2006 | Thrift et al. | |
| 7,027,987 B1 | 4/2006 | Franz et al. | |
| 7,062,477 B2 | 6/2006 | Fujiwara et al. | |
| 7,113,981 B2 | 9/2006 | Slate | |
| 7,117,159 B1 | 10/2006 | Packingham et al. | |
| 7,158,959 B1* | 1/2007 | Chickering et al. | 706/47 |
| 7,188,066 B2 | 3/2007 | Falcon et al. | |
| 7,203,645 B2 | 4/2007 | Pokhariyal et al. | |
| 7,231,380 B1* | 6/2007 | Pienkos | |
| 7,263,489 B2* | 8/2007 | Cohen et al. | 704/270 |
| 7,324,947 B2 | 1/2008 | Jordan et al. | |
| 7,428,555 B2* | 9/2008 | Yan | 707/104.1 |
| 7,447,636 B1 | 11/2008 | Schwartz et al. | |
| 7,483,885 B2 | 1/2009 | Chandrasekar et al. | |
| 7,519,534 B2 | 4/2009 | Maddux et al. | |
| 7,654,455 B1* | 2/2010 | Bhatti et al. | 235/385 |
| 7,769,786 B2* | 8/2010 | Patel | 707/803 |
| 7,809,601 B2* | 10/2010 | Shaya et al. | 705/7.31 |
| 7,904,296 B2 | 3/2011 | Morris | |
| 7,934,658 B1* | 5/2011 | Bhatti et al. | 235/462.45 |
| 7,949,526 B2* | 5/2011 | Ju et al. | 704/246 |
| 8,165,916 B2* | 4/2012 | Hoffberg et al. | 705/14.66 |
| 8,321,278 B2* | 11/2012 | Haveliwala et al. | 705/14.66 |
| 8,321,427 B2 | 11/2012 | Stampleman et al. | |
| 8,515,753 B2 | 8/2013 | Kim et al. | |
| 2001/0019604 A1 | 9/2001 | Joyce | |
| 2002/0015480 A1 | 2/2002 | Daswani | |
| 2002/0032549 A1 | 3/2002 | Axelrod et al. | |
| 2002/0032564 A1 | 3/2002 | Ehsani et al. | |
| 2002/0046030 A1* | 4/2002 | Haritsa et al. | 704/256 |
| 2002/0049535 A1 | 4/2002 | Rigo | |
| 2002/0106065 A1 | 8/2002 | Joyce | |
| 2002/0146015 A1 | 10/2002 | Bryan | |
| 2003/0004728 A1 | 1/2003 | Keiller | |
| 2003/0028380 A1 | 2/2003 | Freeland | |
| 2003/0033152 A1 | 2/2003 | Cameron | |
| 2003/0061039 A1* | 3/2003 | Levin | 704/246 |
| 2003/0065427 A1 | 4/2003 | Funk | |
| 2003/0068154 A1 | 4/2003 | Zylka | |
| 2003/0069729 A1 | 4/2003 | Bickley et al. | |
| 2003/0073434 A1 | 4/2003 | Shostak | |
| 2003/0093281 A1 | 5/2003 | Geilhufe et al. | |
| 2003/0125928 A1 | 7/2003 | Lee et al. | |
| 2003/0177013 A1 | 9/2003 | Falcon et al. | |
| 2003/0212702 A1 | 11/2003 | Campos et al. | |
| 2004/0077334 A1 | 4/2004 | Joyce | |
| 2004/0110472 A1 | 6/2004 | Witkowski | |
| 2004/0127241 A1 | 7/2004 | Shostak | |
| 2004/0132433 A1 | 7/2004 | Stern | |
| 2004/0199498 A1 | 10/2004 | Kapur et al. | |
| 2005/0010412 A1 | 1/2005 | Aronowitz | |
| 2005/0071224 A1* | 3/2005 | Fikes et al. | 705/14 |
| 2005/0125224 A1 | 6/2005 | Myers et al. | |
| 2005/0143139 A1 | 6/2005 | Park | |
| 2005/0144251 A1 | 6/2005 | Slate | |
| 2005/0170863 A1 | 8/2005 | Shostak | |
| 2005/0228670 A1 | 10/2005 | Mahajan et al. | |
| 2006/0018440 A1 | 1/2006 | Watkins | |
| 2006/0028337 A1 | 2/2006 | Li | |
| 2006/0050686 A1 | 3/2006 | Velez-Rivera | |
| 2006/0064177 A1 | 3/2006 | Tian et al. | |
| 2006/0085521 A1 | 4/2006 | Sztybel | |
| 2006/0136292 A1* | 6/2006 | Bhati et al. | 705/14 |
| 2006/0149635 A1* | 7/2006 | Bhatti et al. | 705/23 |
| 2006/0206339 A1 | 9/2006 | Silvera | |
| 2006/0206340 A1 | 9/2006 | Silvera | |
| 2006/0259467 A1 | 11/2006 | Westphal | |
| 2006/0271546 A1 | 11/2006 | Phung | |
| 2007/0027864 A1 | 2/2007 | Collins et al. | |
| 2007/0033003 A1 | 2/2007 | Morris | |
| 2007/0067285 A1 | 3/2007 | Blume et al. | |
| 2008/0021860 A1 | 1/2008 | Wiegering et al. | |
| 2008/0103887 A1* | 5/2008 | Oldham et al. | 705/14 |
| 2008/0103907 A1* | 5/2008 | Maislos et al. | 705/14 |
| 2008/0250448 A1* | 10/2008 | Rowe et al. | 725/32 |
| 2009/0048910 A1* | 2/2009 | Shenfield et al. | 705/14 |

FOREIGN PATENT DOCUMENTS

| | | |
|---|---|---|
| EP | 1633150 | 3/2006 |
| EP | 1633151 | 3/2006 |
| EP | 1742437 | 1/2007 |
| WO | WO 00/16568 | 3/2000 |
| WO | WO 00/21232 | 4/2000 |
| WO | WO 01/22112 | 3/2001 |
| WO | WO 01/22249 | 3/2001 |
| WO | WO 01/22633 | 3/2001 |
| WO | WO 01/22712 | 3/2001 |
| WO | WO 01/22713 | 3/2001 |
| WO | WO 01/39178 | 5/2001 |
| WO | WO 01/57851 | 8/2001 |
| WO | WO 02/07050 | 1/2002 |
| WO | WO 02/11120 | 2/2002 |
| WO | WO 02/17090 | 2/2002 |
| WO | WO 02/097590 | 12/2002 |
| WO | WO 2004/021149 | 3/2004 |
| WO | WO 2004/077721 | 9/2004 |
| WO | WO 2005/079254 | 9/2005 |
| WO | WO 2006/029269 | 3/2006 |
| WO | WO 2006/033841 | 3/2006 |
| WO | WO 2006/098789 | 9/2006 |

OTHER PUBLICATIONS

Chan, et al.; *Efficient Codebook Search Procedure for Vector-Sum Excited Linear Coding of Speech*; Oct. 27, 1994; Electronics Letters, IEE Stevenage, GB, vol. 30, No. 22, pp. 1830-1831, , ISSN 0013-5194.

Chan, Cheung-Fat: *Fast Stochastic Codebook Search Through the Use of Odd-Symmetric Crosscorrelation Basis Vectors*; May 9, 1995; Acoustics, Speech and Signal Processing, 1995. ICASSP-95, 1995 International Conference on Detroit Mi May 9-12, 1995; vol. 1, pp. 21-24 par. 1 ISBN0-7803-2431-5.

(56) References Cited

OTHER PUBLICATIONS

Chen, et al.; *Diagonal Axes Method (DAM): A Fast Search Algorithm for Vector Quantization*; Jun. 1997; IEEE Transactions on Circuts and Systems for Video Technology, IEEE Service Center, Piscataway, NJ, vol. 7, No. 3 , ISSN 1051-8215; par. I, II.

Hanzo, et al.; *Voice Compression and Communications—Principles and Applications for Fixed and Wireless Channels*; 2001, wiley, ; ISBN 0-471-15039-8; par. 4.3.3.

Salami, et al.; *A Fully vector Quantised Self-Excited Vocoder*; May 23, 1989; Glasgow May 23-26, 1989 International Conference on Acoustics, Speech & Signal Processing. ICASSP, IEE vol. 1 Conf. 14; par. 3.1.

Schötz, S., Automatic prediction of speaker age using CART, << http://person2.sol.lu.se/SusanneSchotz/downloads/SR_paper_SusanneS2004.pdf>>, Course paper for course in Speech Recognition, Lund University, 2003, 8 pages.

Schötz, Susanne; "Automatic Estimation of Speaker Age using CART"; Fall Semester 2003, Course in Speech Recognition, Course Paper, 8 pages, Lund University, Sweden.

Amir, A. et al., "Advances in Phonetic Word Spotting", IBM Research Report RJ 10215, Aug. 2001, pp. 1-3.

* cited by examiner

METHOD AND APPARATUS FOR AUTOMATICALLY DETERMINING SPEAKER CHARACTERISTICS FOR SPEECH-DIRECTED ADVERTISING OR OTHER ENHANCEMENT OF SPEECH-CONTROLLED DEVICES OR SERVICES

CROSS REFERENCE TO RELATED APPLICATIONS

This application is a Continuation-in-Part of U.S. patent application Ser. No. 10/699,543, filed Oct. 30, 2003 now U.S. Pat. No. 7,519,534, which claims priority to U.S. provisional patent application Ser. No. 60/422,561, filed Oct. 31, 2002, each of which is incorporated herein in its entirety by this reference thereto.

BACKGROUND OF THE INVENTION

1. Technical Field

The invention relates to speech recognition. More particularly, the invention relates to a method and apparatus for automatically determining speaker characteristics for speech-directed advertising or other enhancement of speech-controlled devices or services.

2. Description of the Prior Art

While speech recognition and control of various systems and devices is progressing, such technology is still quite primitive. For example, the output of a speech recognition system, comprising recognized text and/or meaning, often provides no insight into context or personal qualities or characteristics of the speaker. It would be advantageous to make use of speaker characteristics, as well as recognized text and/or meaning, in processing user utterances.

SUMMARY OF THE INVENTION

The invention relates to computer systems or electronic devices that process human speech, as a means of controlling or otherwise interacting with those systems or devices. (However, spoken commands need not be the sole mode of input to such systems or devices. It is not unusual for such systems to accept other forms of input, such as typing on a keyboard, using an electronic pointing device or mouse, or pressing buttons, when the physical apparatus allows such operations.)

Typical device examples include a mobile telephone (also known as a cell phone), a personal digital assistant (PDA), a portable music player, or a voice-enabled television remote control. Typical system examples comprise a voice-enabled website, a telephone-based interactive voice response system (IVR), or some other automatic source of information, assistance, or vehicle for commerce.

In such devices and systems, human speech is used as a means of specifying a needed input, such as the name of a city or airport (viz, "Denver International"), or a desired action ("purchase ticket"). The recognized text that corresponds to the spoken utterance (thus, the nominal output of the speech recognition system), and its associated meaning or interpretation, is referred to herein as the primary information conveyed by the utterance.

However, in addition to conveying such primary information, human speech may also convey information concerning the speaker's gender, age, socioeconomic status, accent, language spoken, emotional state, or other personal characteristics. This is referred to herein as secondary information. While not entirely reliable, there exist automatic means to deduce these characteristics, with varying degrees of success, from a speech sample.

The invention concerns both the means of automatic discovery and use of such secondary information to direct other aspects of the behavior of the controlled system. For example, one embodiment of the invention comprises an improved method to determine, with high reliability, the gender of an adult speaker. A further embodiment of the invention comprises the use of this information to display a gender-appropriate advertisement to the user of, say, an information retrieval system that uses a cell phone as the input and output device. The invention is not limited to gender and such secondary information can include, for example, any of information concerning the speaker's age, socioeconomic status, accent, language spoken, emotional state, or other personal characteristics.

DETAILED DESCRIPTION OF THE INVENTION

The invention relates to computer systems or electronic devices that process human speech, as a means of controlling or otherwise interacting with those systems or devices. (However, it should be noted that spoken commands need not be the sole mode of input to such systems or devices. It is not unusual for such systems to accept other forms of input, such as typing on a keyboard, using an electronic pointing device or mouse, or pressing buttons, when the physical apparatus allows such operations.)

Typical device examples include a mobile telephone (also known as a cell phone), a personal digital assistant (PDA), a portable music player, or a voice-enabled television remote control. Typical system examples comprise a voice-enabled website, a telephone-based interactive voice response system (IVR), or some other automatic source of information, assistance, or vehicle for commerce.

In such devices and systems, human speech is used as a means of specifying a needed input, such as the name of a city or airport (viz, "Denver International"), or a desired action ("purchase ticket"). Text that corresponds to the spoken utterance, and its associated meaning or interpretation, is referred to herein as the primary information conveyed by the utterance.

However, in addition to conveying such primary information, human speech may also convey information concerning the speaker's gender, age, socioeconomic status, accent, language spoken, emotional state, or other personal characteristics. This is referred to herein as secondary information. While not entirely reliable, there exist automatic means to deduce these characteristics, with varying degrees of success, from a speech sample.

The invention concerns both the means of automatic discovery and use of such secondary information to direct other aspects of the behavior of the controlled system. For example, one embodiment of the invention comprises an improved method to determine, with high reliability, the gender of an adult speaker. A further embodiment of the invention comprises the use of this information to display a gender-appropriate advertisement to the user of, say, an information retrieval system that uses a cell phone as the input and output device. The invention is not limited to gender and such secondary information can include, for example, any of information concerning the speaker's age, socioeconomic status, accent, language spoken, emotional state, or other personal characteristics.

General System Architecture

Figure 1:
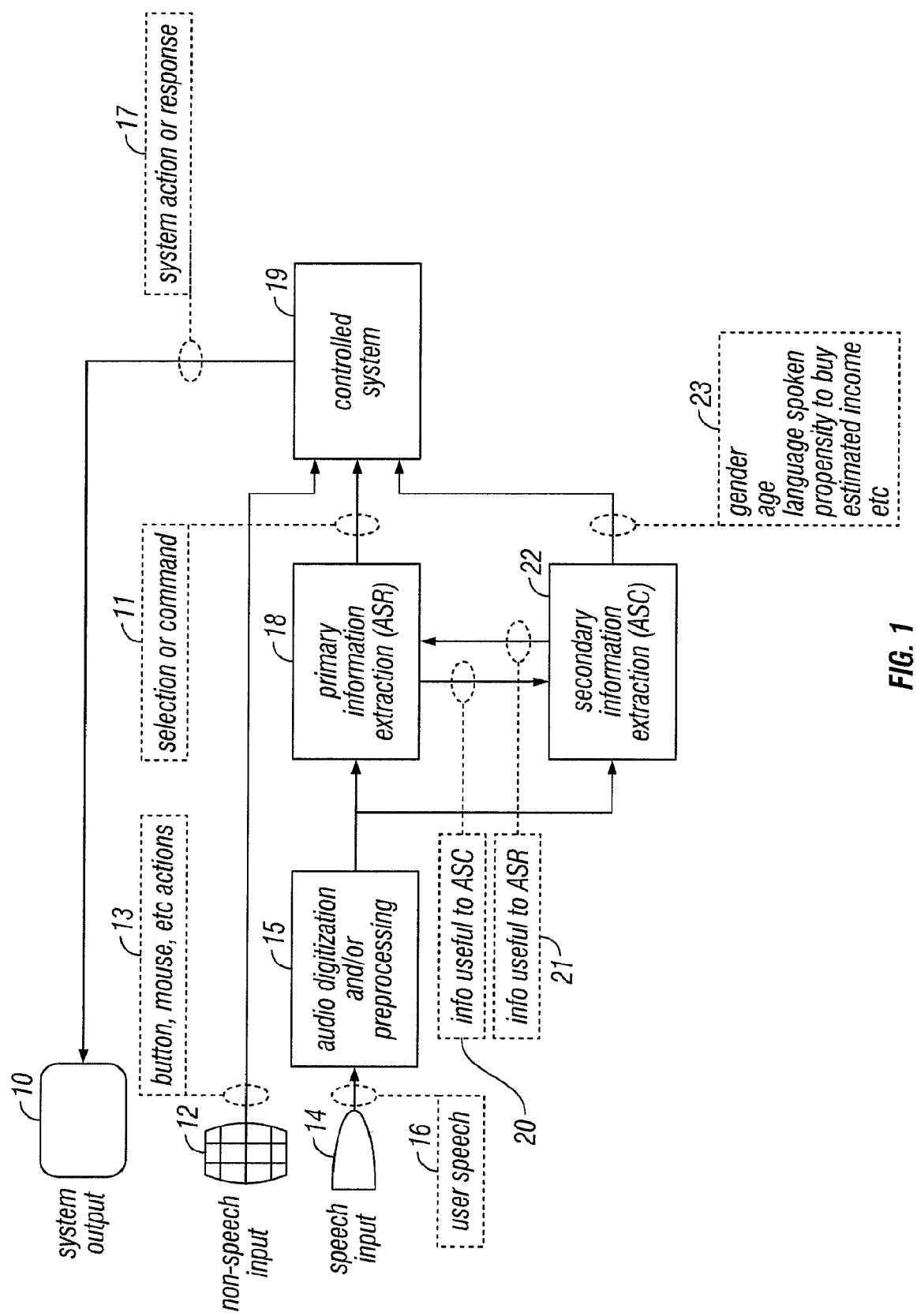
FIG. 1 is a block schematic diagram of a system architecture showing an application mode according to the invention.

FIG. 1 is a block schematic diagram of a system architecture showing an application mode according to the invention. In FIG. 1, an input or data capture device, such as a speech input device 14 or a non-speech input device 12 is shown. In the presently preferred embodiment of the invention, the input device must include audio, but may also include other input means, such as a mouse, buttons, etc. If the input is non-speech input, such as button, mouse, etc. user actions 13, then such input is provided to a controlled system 19 (discussed in greater detail below). If the input is speech input, i.e. user speech 16, then the speech information is first presented to a module 15 that performs audio digitization and/or preprocessing. The output of the audio digitization and/or preprocessing module 15 is provided to both a primary information extraction module 18 and a secondary information extraction module 22 (both of which are discussed in greater detail below).

The system also includes an output or data rendering device 10, which may comprise, for example, a telephone handset display, a television set, or an audio output only device.

The primary information extraction module 18 typically comprises an automatic speech recognition system module (ASR), and may optionally include a meaning extraction/semantic analysis/natural language understanding (NLU) module. The primary information extraction module may also contribute to 20, or make use of 21, secondary information. For example, the primary information extraction module may be used to identify the language that is being spoken. The ASR system may also be used to identify the gender of the speaker (by a means other than the procedure discussed below).

The secondary information extraction module 22 is denoted herein as the automatic speech characteristics module (ASC). The ASC module estimates or extracts explicit or implicit indicators of interest 23, such as, for example, gender, age, phone rate (speech rate), and power spectral density estimates. Such secondary information may be either categorical or continuous, may include merely presumed or possible informants of desired personal characteristics, and may also contribute to, or make use of, primary information. For example, the ASC may advise the ASR system that it is better to decode the speech using male-specific or female-specific acoustic models.

Those skilled in the art will appreciate that both the ASR and ASC may be used to extract other information, and may be arranged to pass additional information there between.

The controlled system 19 makes use of the primary and secondary information extracted, respectively, by the ASR and ASC, to produce a system action or response 17 as a system output 10. For example, the controlled system may use such information to perform searches, vend products or services to customer, and/or report independent sources of customer information. For example, if customer has enrolled in some subscriber affinity program, such as a frequent-flyer or frequent-traveler program, then an independent source of socioeconomic data, such as annual household income, may be available. The controlled system may also be used to generate reports of final behavior or the activity of users for later analysis. In keeping with the preferred embodiment of the invention, there is an explicit lack of commitment regarding where processing takes place. For example, all such processing can occur in a data capture terminal, such as a mobile phone handset, remote control, etc., in a remote system, such as a central IVR system, etc., or such processing can be distributed between or among several distinct functional units.

Modes of Operation

Learning Mode

Figure 2:
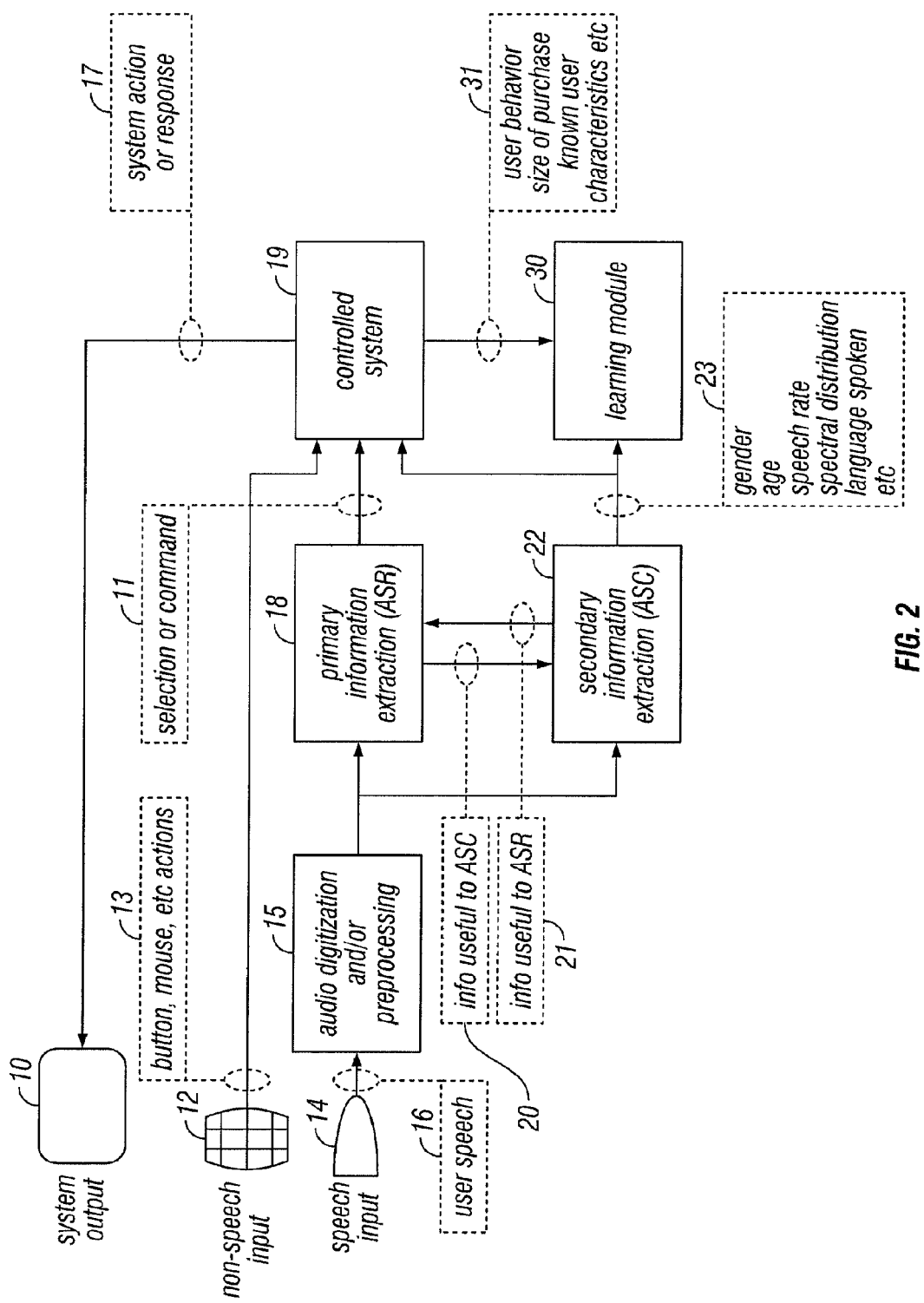
FIG. 2 is a block schematic diagram of a system architecture showing a learning mode according to the invention.

FIG. 2 is a block schematic diagram of a system architecture showing a learning mode according to the invention. The learning mode provides for system learning based around the notion of a session. That is, learning results from a series of queries or interactions, including at least some conducted by speech, followed by user behavior, e.g. the purchase of a plane or train ticket, download of a ring tone, start of video-on-demand playback, etc.

For purposes of the discussion herein, secondary information is notated S1, S2, S3, . . . ; and behavioral aspects or independent user characteristics aspects are notated B1, B2, . . . . The system comprises a learning module 30 that records both secondary information and user behavior 31, yielding a large collection of examples, which are denoted E. The learning module analyzes this information to determine economically valuable relationships between speech and behavior, and/or speech and speaker's personal characteristics, e.g. discovering speech characteristics that indicate high propensity to purchase, or high socioeconomic status.

In the presently preferred embodiment of the invention, typical (although not exclusive) means of analysis comprise:

Multivariate correlation analysis and linear regression, as described in *Introduction to Mathematical Statistics*, Fifth Edition, by Paul G. Hoel, John Wiley and Sons publishers, © 1984, ISBN 0-471-89045-6;

Mutual information statistics, as described in *Elements of Information Theory*, by Thomas M. Cover and Joy A. Thomas, John Wiley and Sons publishers, © 1991, ISBN 0-471-06259-6;

Clustering and decision trees, as described in *Data Mining: Practical Machine Learning Tools and Techniques*, Second Edition, by Ian H. Witten and Eibe Frank, Morgan Kauffman publishers, © 2005, ISBN 0-12-088407-0; and Perceptrons, neural networks, support vector machines, and linear classifiers, as described in *The Elements of Statistical Learning*, by T. Hastie, R. Tibshirani and J. H. Friedman, Springer publishers © 2001, ISBN 0-387-95284-5.

In accordance with the presently preferred embodiment of the invention, typical examples of known methods for extracting secondary information comprise:

*Automatic Estimation of Speaker Age using CART*, Susanne Schotz,

*Age-related acoustic changes in voiceless English fricatives*, R. A. Fox and S. Nissen, Proceedings from the Meikai Linguistics and Phonetics Conference, Meikai University, Japan; and Acoustic and spectral characteristics of young children's fricative productions: A developmental perspective, Shawn L. Nissen, Robert Allen Fox, The Journal of the Acoustical Society of America—October 2005—Volume 118, Issue 4, pp. 2570-2578.

Application Mode

Application mode uses secondary information, and possibly (but not necessarily) also the results of the learning mode, to guide or vary behavior of a controlled system. For instance, the application mode can use secondary information to give advertisers access only to female or male users. The application mode can also use secondary information to give advertisers access to those whose speech shows a high propensity to purchase. Further, the application mode may use secondary information such that the learning module may simultaneously continue learning. Thus, the system continues to perform previously described learning functions while in the application mode.

Improved Means of Gender Classification

Typical techniques for gender classification in connection with the invention involve computing pitch on voiced speech by autocorrelation methods, then comparing pitch with a threshold to decide if it is male or female.

A summary of basic techniques for pitch estimation can be found in Rabiner, L. R., M. J. Cheng, A. E. Rosenberg, and C. A. McGonegal, *A comparative performance study of several pitch detection algorithms*, IEEE Transactions on Acoustics, Speech and Signal Processing, 24, 1976, pp. 399-417.

A summary of the method used to estimate pitch is as follows:

1. The utterance (utt) is processed as a sequence of frames. Each frame typically consists of 205 samples. Successive frames typically overlap. Typically, each successive frame contains 10 ms of new speech data. At an 8 kHz sampling rate, this corresponds to 80 new samples.
2. The autocorrelation algorithm is used to extract a pitch estimate for every frame in the utterance. This is a time domain algorithm that produces an estimate for the pitch period. Because we are working with raw signals sampled at 8 kHz, the natural resolution for the pitch period estimates is one sampling period, or 1/8000 sec. Pitch frequency ($F_0$) is equal to 1/(pitch period). We can only obtain $F_0$ estimates lying at the points 8000/m Hz, where m is some integer=pitch period in # samples.
3. To obtain an estimate for the utt's pitch frequency ($F_0$), we histogram the $F_0$ values for the frames in the utt, and select the greatest peak, or the mode of the histogram. We have used constant-width bins in the histogram, each being 20 Hz wide. The utt's $F_0$ estimate is taken as the center-frequency of the mode bin. So, by this procedure, we measure the utt's $F_0$ with a resolution equal to the histogram bin widths, or 20 Hz.
4. Only voiced frames have an $F_0$ estimate. Unvoiced or silence frames do not have any pitch associated with them. So all unvoiced/silence frames are excluded from the histogram, and therefore from the computation of the utt's $F_0$ estimate.

It is possible to substitute an FFT-based algorithm for the time-domain autocorrelation algorithm described above. This yields improved computational efficiency. A brief summary of the FFT-based algorithm is as follows:

1. Perform center-clipping on each signal frame (frame length=205 samples).
2. For a typical FFT size of 256 samples, keep half the FFT-size, i.e. 128 samples, of the center-clipped frame, and zero out the second half.
   The reason for this step is as follows: Taking the squared magnitude of the spectrum of a signal frame is equivalent to taking a circular auto-correlation of that frame in the time domain. The pitch extraction algorithm needs a plain, linear auto-correlation. It can be shown easily that circular autocorrelation done on a frame buffer that is half or less full contains exactly the linear autocorrelation function of the frame in it. So we obtain the linear autocorrelation for the frames via the FFT approach by keeping only the first half of the FFT-size buffer full before the transform.
3. Take the forward Fast Fourier Transform.
4. Compute squared magnitude of the Fourier Transform.
5. Take the inverse FFT of the squared magnitude spectrum—this is the frame autocorrelation.
6. Search for the highest peak in the autocorrelation. Decide if the frame is voiced by comparing the peak amplitude with all samples of lags from 15 samples, corresponding to a pitch of 533 Hz, to 128 samples (pitch of 62.5 Hz) for a point exceeding in its value a voicing threshold of 0.32*(autocorrelation at 0 lag). If such a point is found, the frame is designated voiced. Otherwise it is designated unvoiced, and that frame is ignored.
7. If voiced, find the pitch for the frame from the peak's position. Incorporate the pitch in the histogram.
8. Determine the pitch for the entire utt by employing the histogram method, as described earlier.

With the pitch estimate in-hand, the typical method for gender classification is as follows: speech with pitch below threshold classified as male, that with pitch above threshold is classified as female. The best threshold on test corpus was 140 Hz, yielding accuracy of 91.7%.

The improved method is based upon the following observation: the first formant, speech cavity resonance, in male speech may be falsely identified as the pitch. Because this frequency typically lies above the threshold just mentioned, in such cases male speakers are erroneously identified as females.

To compensate for this problem, the new decision criterion is as follows: speech with a pitch below 155 Hz or above 285 Hz classified as male, otherwise classified as female. This yields an accuracy of 93.5%, which is a more than 20% reduction in the error rate.

Means of Age Classification

In this section we describe a method for discriminating between adults and children, by spoken utterances. The technique developed here classifies the speaker with an accuracy of about 60%.

The basic method is to analyze a given utterance on a frame-by-frame basis, akin to the gender determination method described above. Also as above, each frame of speech is classified as voiced (V), unvoiced (U), or silence (S), with unvoiced and silence frames discarded. The method assumes the existence of two probability distribution functions (pdfs) of the distribution of spectral peaks, one for adults, one for children, denoted $p_A$ and $p_C$. We also refer to these as the adult spectral pdf and the child spectral pdf, respectively. A discussion of how to construct these pdfs appears at the end of this section.

Let us assume then that the utterance in question has already been divided up into frames, and that unvoiced and silence frames have been discarded. Let $f_1, \ldots, f_N$ constitute the sequence of frames. For each frame, compute its Hamming-windowed FFT, and then compute the squared magnitude of each FFT coefficient. Find the index of the maximum of these within the FFT. This is the spectral peak. Let $z_i$ denote the spectral peak of frame $f_i$.

From the sequence of spectral peak indices, compute the two quantities $$\log P_{utterance}(\text{adult}) = \sum_{1 \leq i \leq N} \log p_A(z_i) \quad (1)$$

$$\log P_{utterance}(\text{child}) = \sum_{1 \leq i \leq N} \log p_C(z_i). \quad (2)$$

Next, from these two values, compute their difference $$\Delta = \log P_{utterance}(\text{child}) - \log P_{utterance}(\text{adult}). \quad (3)$$

Finally, compare this quantity with an experimentally determined threshold to classify the utterance: child if the quantity $\Delta$ exceeds this threshold, adult if it does not. Experiments have shown that the value 4.4 gives correct classification about 60% of the time.

Figure 3:
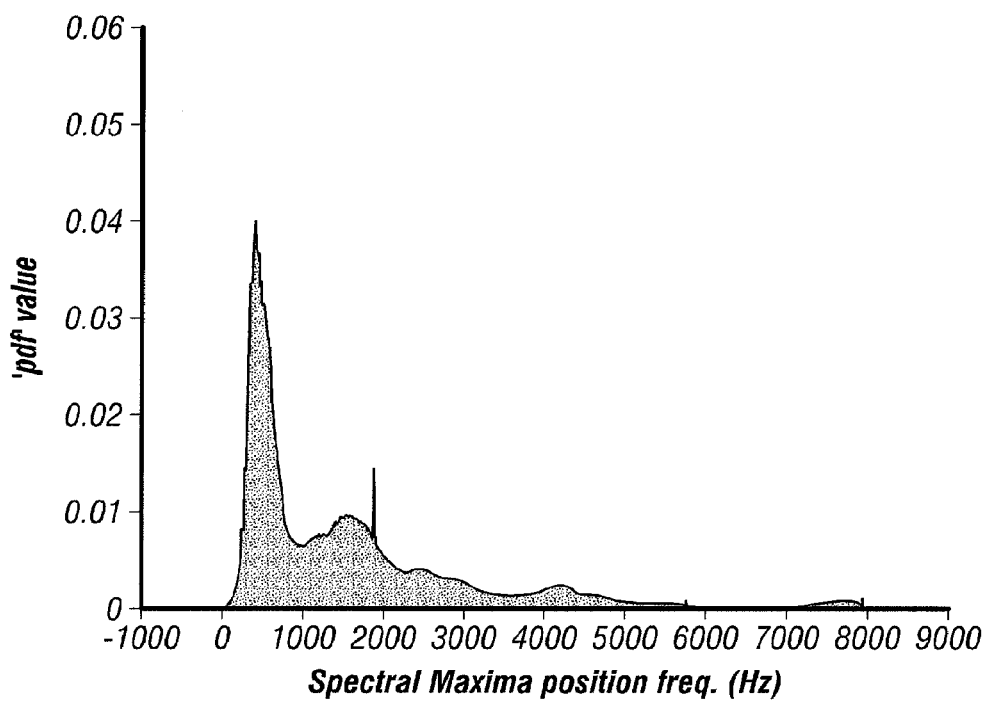
FIG. 3 is a graph showing an adult spectral pdf $p_A$ according to the invention.
Figure 4:
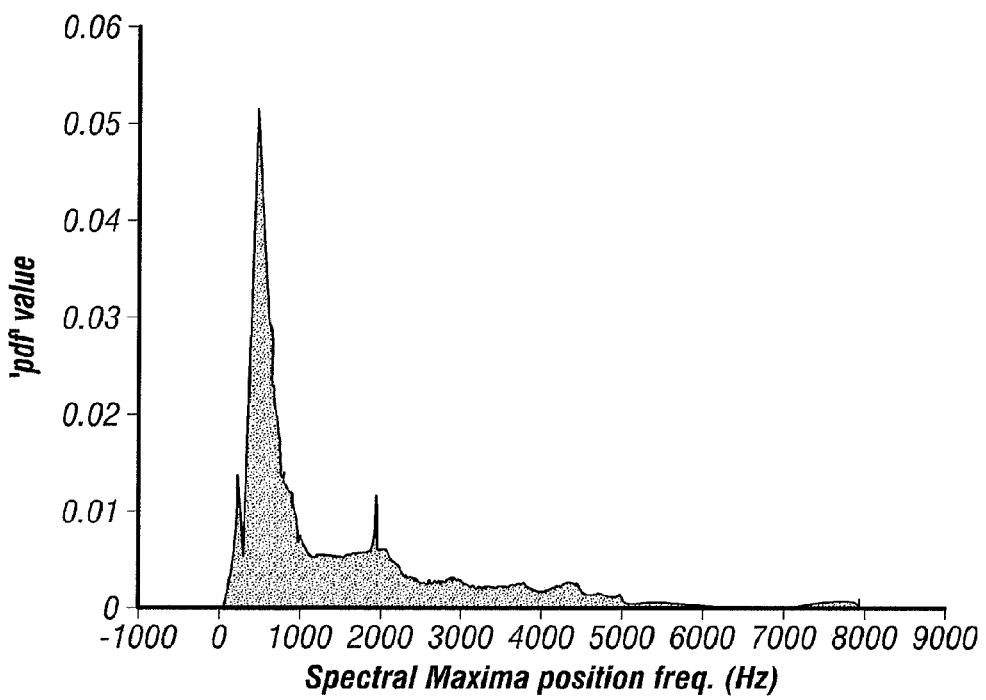
FIG. 4 is a graph showing a child spectral pdf, $p_C$ according to the invention.

To develop the required adult spectral pdf and child spectral pdf, $p_A$ and $p_C$, it suffices to process a large corpus of utterances, with each utterance labeled as adult or child as the case may be. By computing the spectral peak of each voiced frame of all adult utterances, and histogramming these values, we may determine an empirical estimate of the pdf $p_A$. Proceeding likewise with the child utterances, we obtain $p_C$. The $p_A$ and $p_C$ used in the development of this invention are exhibited as FIGS. 3 and 4, respectively.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. An apparatus for automatically determining desired speaker characteristics, configured to operate in an application mode or a learning mode or in both an application mode and a learning mode, comprising:
    a speech input device comprising a mobile device having an input and output, wherein said input comprises a means for receiving speech inputs in the form of one or more utterances and for receiving non-speech inputs, wherein said mobile device is configured for transmitting and receiving data over a network;
    a primary information extraction module for receiving one or more utterances from said speech input device, said primary information extraction module comprising an automatic speech recognition module for collecting primary information in the form of: transcribed text, symbolic representation of associated meaning, or a combination of transcribed text and symbolic representation of associated meaning;
    a secondary information extraction module for receiving utterances from said speech input device, said secondary information extraction module comprising an automatic speech characteristics module that estimates or extracts secondary information comprising explicit or implicit speech indicators of interest, corresponding to desired speaker characteristics; and
    a controlled system for using primary and secondary information extracted by said automatic speech recognition system module and said automatic speech characteristics module to produce a system action or response as a system output;
    a learning module configured to record both secondary information and user behavior, said learning module configured to analyze said information to determine any of economically valuable relationships between speech and behavior, and economically valuable relationships between speech and speaker's personal characteristics, wherein said economically valuable relationships indicate any of a high propensity to purchase and a high socioeconomic status;
    said learning module analyzing either said secondary information and user behavior or said secondary information and speaker personal characteristics, for the discovery of relations between said secondary information and user behavior or said secondary information and speaker personal characteristics, by application of any of:
    multivariate correlation analysis and linear regression;
    mutual information statistics;
    clustering and decision trees; and
    perceptrons, neural networks, support vector machines, and linear classifiers;
    wherein, during said application mode, said controlled system presents one or more advertisements to said user in addition to producing said system action, wherein the content of said advertisement is based on factors selected from among a group of factors consisting of:
    primary information;
    secondary information; and
    a combination of primary information and secondary information;
    wherein, during said learning mode, learning results from a series of queries or interactions, including at least some conducted by speech, followed by user behavior.

2. The apparatus of claim 1, said secondary information comprising at least one of:
    gender, age, socioeconomic status, accent, language spoken, emotional state, propensity to execute a purchase, phone rate (speech rate), or power spectral density estimates.

3. The apparatus of claim 1, said primary information extraction module further comprising:
    a means for natural language understanding of said primary information.

4. The apparatus of claim 1, further comprising:
    a non-speech input that is provided to said controlled system.

* * * * *